(12) United States Patent
Vora et al.

(10) Patent No.: US 10,699,571 B2
(45) Date of Patent: Jun. 30, 2020

(54) HIGH DEFINITION 3D MAPPING

(71) Applicant: Ford Global Technologies, LLC, Dearborn, MI (US)

(72) Inventors: Ankit Girish Vora, Dearborn, MI (US); Siddharth Agarwal, Dearborn, MI (US); Jakob Nikolaus Hoellerbauer, Canton, MI (US); Faizan Shaik, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 121 days.

(21) Appl. No.: 15/831,295

(22) Filed: Dec. 4, 2017

(65) Prior Publication Data
US 2019/0172349 A1 Jun. 6, 2019

(51) Int. Cl.
*G08G 1/0968* (2006.01)
*G01C 21/36* (2006.01)
*G01C 21/32* (2006.01)
*G01S 17/89* (2020.01)
*G01S 17/86* (2020.01)

(52) U.S. Cl.
CPC ....... *G08G 1/096833* (2013.01); *G01C 21/32* (2013.01); *G01C 21/3602* (2013.01); *G01S 17/86* (2020.01); *G01S 17/89* (2013.01)

(58) Field of Classification Search
CPC ............ B60R 2300/607; G08G 1/0968; G08G 1/096833; G08G 1/096844; G08G 1/0969; G01C 21/34; G01C 21/3407; G01C 21/36; G01C 21/3602; G01C 21/3667; G01C 21/3673; G01C 21/3676; G01C 21/3679; G01C 21/3682; G01C 21/3685
See application file for complete search history.

(56) References Cited

U.S. PATENT DOCUMENTS

| | | | |
|---|---|---|---|
| 7,606,579 B2 | 10/2009 | Thacher | |
| 8,612,136 B2 | 12/2013 | Levine et al. | |
| 8,731,305 B1 | 5/2014 | Mantri | |
| 9,103,671 B1 | 8/2015 | Breed et al. | |
| 9,151,631 B2 * | 10/2015 | Lee | G01C 21/36 |
| 2004/0059500 A1 * | 3/2004 | Nakano | G01C 21/3647 |
| | | | 701/431 |

(Continued)

FOREIGN PATENT DOCUMENTS

| | | | |
|---|---|---|---|
| EP | 1045224 A2 | 10/2000 | |
| WO | WO-2007102406 A1 * | 9/2007 | G01C 21/3484 |
| WO | 2014203475 A1 | 12/2014 | |

OTHER PUBLICATIONS

Wired article entitled "Autonomous Cars Will Require a Totally New Kind of Map," Greg Miller Science dated Dec. 15, 2014 6:45AM, printed Aug. 21, 2017, https://www.wired.com/2014/12/nokia-here-autonomous-car-maps/.

*Primary Examiner* — Thomas G Black
*Assistant Examiner* — Sara J Lewandroski
(74) *Attorney, Agent, or Firm* — Frank A. MacKenzie; Bejin Bieneman PLC

(57) ABSTRACT

A system includes a processor and a memory. The memory stores instructions executable by the processor to determine a plurality of waypoints for mapping an area by analyzing a received aerial image of the area, to select an optimal number of the waypoints for mapping, and to actuate the vehicle to traverse a route determined to cover the selected waypoints.

12 Claims, 6 Drawing Sheets

(56) References Cited

U.S. PATENT DOCUMENTS

| | | | |
|---|---|---|---|
| 2005/0288859 A1* | 12/2005 | Golding | G01C 21/3602 |
| | | | 701/438 |
| 2007/0069923 A1* | 3/2007 | Mendelson | G01C 21/206 |
| | | | 340/988 |
| 2010/0332132 A1* | 12/2010 | Okude | G01C 21/3476 |
| | | | 701/414 |
| 2014/0244161 A1* | 8/2014 | Strassenburg-Kleciak | |
| | | | G01C 21/3635 |
| | | | 701/436 |
| 2015/0203156 A1* | 7/2015 | Hafner | B62D 13/06 |
| | | | 701/36 |
| 2015/0346723 A1* | 12/2015 | Pedersen | G05D 1/0088 |
| | | | 701/25 |
| 2016/0054452 A1* | 2/2016 | Cosatto | G01C 21/3697 |
| | | | 701/412 |
| 2017/0219371 A1* | 8/2017 | Suzuki | G01C 21/3484 |
| 2017/0339820 A1* | 11/2017 | Foster | G01C 21/32 |
| 2017/0371340 A1* | 12/2017 | Cohen | G06T 7/593 |
| 2018/0217594 A1* | 8/2018 | Greenberger | G08G 1/202 |
| 2019/0041228 A1* | 2/2019 | Singhal | G05D 1/0088 |
| 2019/0056739 A1* | 2/2019 | Sunil Kumar | G05D 1/0212 |
| 2019/0324475 A1* | 10/2019 | Dean | G05D 1/0219 |
| 2019/0383635 A1* | 12/2019 | Jang | G06T 15/205 |
| 2019/0384296 A1* | 12/2019 | Shashua | G01C 21/3623 |

\* cited by examiner

HIGH DEFINITION 3D MAPPING

BACKGROUND

A vehicle such as an autonomous or semi-autonomous vehicle can use data from a LIDAR (Light Imaging Detection And Ranging) sensor to aid navigation. LIDAR sensors can be used to generate point cloud data, i.e., a collection of data describing points in three dimensions. Further, an autonomous vehicle may compare its substantially real-time LIDAR point-cloud data to a three-dimensional (3D) map of an area in which the vehicle is operating for navigation within the area. A 3D map of an area can be generated from LIDAR data collected by one or more mapping vehicles that have previously traversed roads in the area for the purpose of obtaining point cloud data for the map. However, using current technology, a problem is that a mapping vehicle may traverse a road segment or the like in an area to be mapped, but collect insufficient data to create the 3D map. When this happens, further data collection is needed, e.g., typically, the road segment or other portion of an area being mapped must be traversed one or more additional times.

DETAILED DESCRIPTION

Introduction

Figure 1:
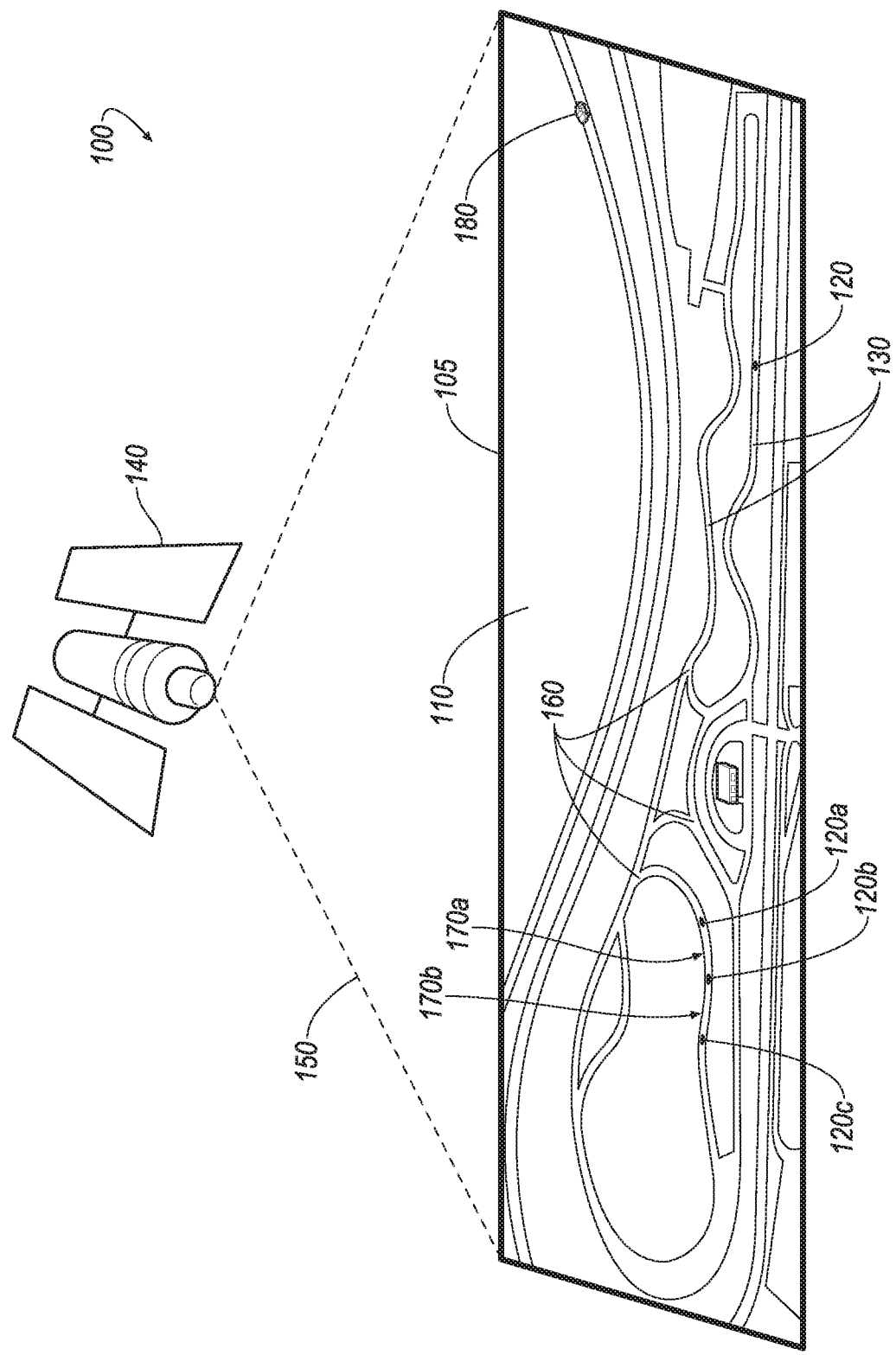
FIG. 1 is a block diagram of an exemplary area and an example satellite providing aerial image of the area.

Disclosed herein is a system that includes a processor and a memory. The memory stores instructions executable by the processor to determine a plurality of waypoints for mapping an area by analyzing a received aerial image of the area, to select an optimal number of the waypoints for mapping, and to actuate a vehicle to traverse a route determined to cover the selected waypoints.

Each of the selected waypoints may be at least on a road surface and an intersection.

The selected waypoints may include a first point and a second point on a road segment, and a curve fitted to the first and second points may correspond to the road segment between the first and second points.

The instructions may include further instructions to at least one of generate and update a map, that covers an area included in the received aerial image, based at least in part on received LIDAR sensor data.

The map may include location coordinates of one or more roads and road features including traffic signs and buildings.

The instructions may include further instructions to determine a vehicle route to traverse each of the selected waypoints for at least a predetermined number of times.

The instructions may include further instructions to output an image to a display device wherein the image includes the area with data superimposed on the plurality of waypoints, and the superimposed data on each of the waypoints is based on a number of traversals of the respective waypoint.

The instructions may include further instructions to receive vehicle location coordinates from a vehicle sensor, and to store received vehicle sensor data and the vehicle location coordinates in a remote computer.

Further disclosed herein is a method including determining a plurality of waypoints for mapping an area by analyzing a received aerial image of the area, selecting an optimal number of the waypoints for mapping, and actuating a vehicle to traverse a route determined to cover the selected waypoints.

Each of the selected waypoints may be at least on a road surface and an intersection.

The selected waypoints may include a first point and a second point on a road segment, and a curve fitted to the first and second points corresponds to the road segment between the first and second points.

The method may further include at least one of generating and updating a map, that covers an area included in the received aerial image, based at least in part on received LIDAR sensor data.

The map may include location coordinates of one or more roads and road features including traffic signs and buildings.

The method may further include determining a vehicle route to traverse each of the selected waypoints for at least a predetermined number of times.

The method may further include outputting an image to a display device wherein the image includes the area with data superimposed on the plurality of waypoints, and the superimposed data on each of the waypoints is based on a number of traversals of the respective waypoint.

The method may further include receiving vehicle location coordinates from a vehicle sensor, and storing received vehicle sensor data and the vehicle location coordinates in a remote computer.

Further disclosed herein is a system including a vehicle, means for determining a plurality of waypoints for mapping an area by analyzing a received aerial image of the area, means for selecting an optimal number of the waypoints for mapping, and means for actuating the vehicle to traverse a route determined to cover the selected waypoints.

Each of the selected waypoints is at least on a road surface and an intersection.

The system may further include means for determining a vehicle route to traverse each of the selected waypoints for at least a predetermined number of times.

The system may further include means for outputting an image to a display device wherein the image includes the area with data superimposed on the plurality of waypoints, and the superimposed data on each of the waypoints is based on a number of traversals of the respective waypoint.

Further disclosed is a computing device programmed to execute any of the above method steps.

Yet further disclosed is a computer program product, comprising a computer readable medium storing instructions executable by a computer processor, to execute any of the above method steps.

System Elements

Vehicle navigation may be based on three-dimensional (3D) map data of an area in which the vehicle is operating. A vehicle computer may use a 3D map of an area to determine a vehicle location and/or to navigate the vehicle within the area. The 3D map can be generated from data collected by vehicles driving in the area and collecting LIDAR data. An aerial image of the area may be used to govern navigation of a LIDAR data collection vehicle in the area.

FIG. 1 illustrates an example system 100 to obtain LIDAR data for 3D mapping in a geographic area 105. Features of an area 105 may be captured in an aerial image 110, e.g., by a satellite 140. A geographic area 105 (or simply area 105) in the context of this disclosure means a two-dimensional area on the surface of the earth. Boundaries or edges of an area 105 may be defined by global positioning system (GPS) coordinates, e.g., as vertices of a triangular or rectangular area 105, a center of a circular area 105, etc. An area 105 may have any dimensions and/or shape, e.g., rectangular, oval, circular, non-geometrical shape, etc. For example, an area 105 may include a neighborhood, a town, an airport, etc. A 3D map of an area 105 can include features in a volume defined by the area as a bottom side. For example, a 3D map of a rectangular area 105 is a digital map that typically includes features in a rectangular volume defined by a rectangular bottom area 105, and a specified height to which mapping is performed, e.g., 3 meters, 5 meters, 25 meters, etc., above ground level. A 3D map of an area 105 includes location coordinates such as global positioning system (GPS) coordinates of points within the area 105, e.g., point that define map features such as roads 130, waypoints 120, intersections 160, etc., and heights of the points within the volume defined by the area 105. In one example, a map may include location coordinates of road 130 features, e.g., traffic sign, building, etc., and/or heights of points on outer surfaces of road 130 features such as buildings, traffic signs, vegetation, etc. An image, such as an aerial image 110, in the present context, is a digital image including a plurality of pixels (or points) and data related to each of the pixels, e.g., color, intensity, etc. An image may be a "captured" image, i.e., captured by a camera or other optical sensor such as a vehicle camera, a satellite 140 camera, etc., and/or may include "generated" image data, i.e., data generated from stored information such as map data, e.g., generated lines illustrating roads within an area 105. Additionally or alternatively, an image may be a "hybrid" image, i.e., may include both captured image data and generated image data, e.g., based on map data, image processing algorithms, etc. For example, a hybrid image may include a road image with a marking superimposed on the captured image data, e.g., based on an output of an image processing algorithm.

An aerial image 110 is a top view of an area 105, e.g., an image captured by a camera above ground surface directed to the ground surface. The camera may be mounted to a satellite 140, aircraft, helicopter, unmanned aerial vehicles (or drones), balloon, stand-alone pole, etc. In one example, a field of view 150 of the satellite 140 camera may output aerial image 110 data including the area 105.

An area 105 may include features such as waypoints 120, roads 130, intersections 160, buildings, landscaping, mountains, etc. A waypoint 120 in the context of this disclosure is a point located on a road 130 and/or an intersection 160 surface, in contrast to a point that is not located on a surface of a road 130, e.g., a point in a wooded area, on a building roof, etc. Waypoints 120 may be designated to support navigating a vehicle 180 to map an area 105, as described further below.

Two or more roads 130 may intersect. A location or a set of points where two or more roads 130 intersect is an intersection 160.

A road 130 may have various features. A road 130 feature is a physical property of the road 130 such as a road 130 surface material, width, number of lanes, lane markings, one-way or two-way, etc., and/or any physical structure surrounding the road 130 such as guard rail, walk-way, traffic sign, traffic light, building(s), bridges, etc. A road 130, herein, includes any type of dirt road 130 or paved road 130, e.g., covered by concrete, asphalt, tar, etc. A road 130 may have one or more lanes. A road 130 may be one-way or two-way.

Figure 6:
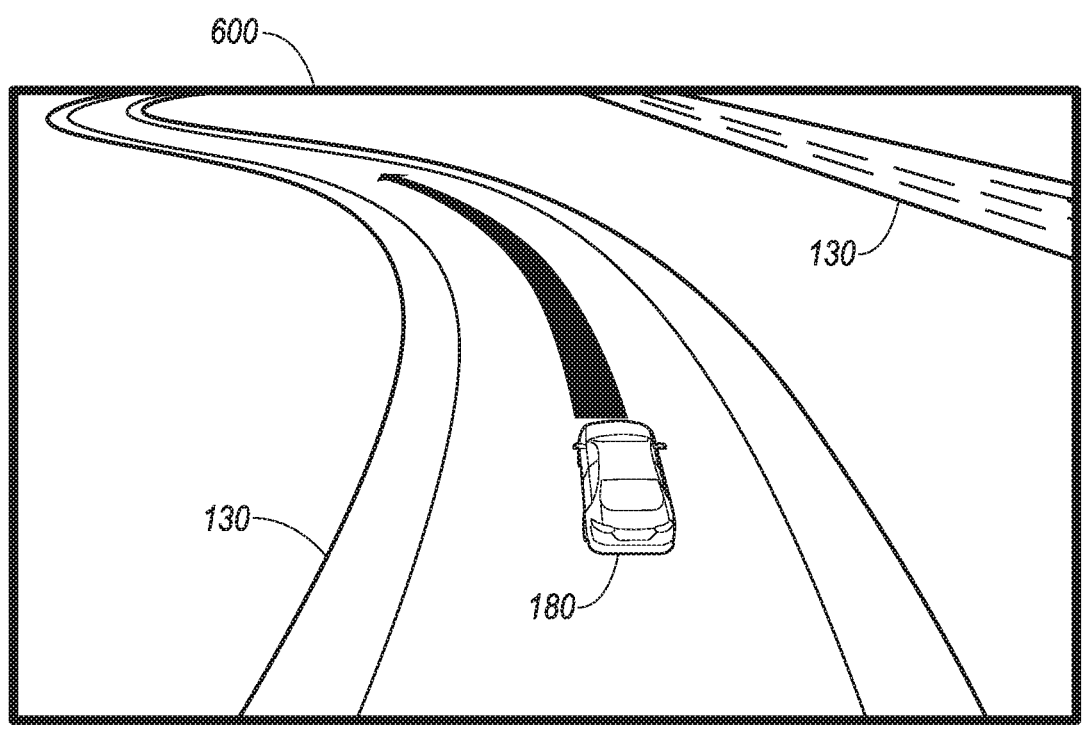
FIG. 6 shows a hybrid landscape image data including routing instruction for the mapping vehicle.

In contrast to an aerial image 110, a landscape image (e.g., such as shown in FIG. 6), in the context of this disclosure, is a two-dimensional image providing a view that is substantially perpendicular to the ground surface, e.g., made by a camera with an axis substantially parallel to the ground surface. Alternatively or additionally, an angle between the axis and the ground surface could be less than 45 degrees. Additionally or alternatively, a landscape image 600 may be a hybrid image, i.e., may include both image data captured by a camera and image data generated based on map data and/or data generated by an image processing algorithm, e.g., an arrow indicating a planned route.

A road 130 may include multiple segments 170a, 170b. A road 130 segment 170a, 170b may include two or more waypoints 120. A segment 170a, 17b is defined by a first and a second waypoint 120a, 120b. For example, the road segment 170a includes all waypoints of the road 130 between a first and a second waypoint 120a, 120b. A road segment 170b may include each waypoint 120 between the second waypoint 120b and a third waypoint 120c. A traversal of, e.g., the road 130 segment 170a, in the context of present disclosure, means that a vehicle 180 has traveled from a first waypoint 120a of the road 130 segment 170a to the second waypoint 120b of the road 130 segment 170a.

An example vehicle 180 includes a computer 210, actuator(s) 220, sensors 230 such as a (Light Detection and Ranging) LIDAR sensor 230, GPS sensor 230, etc., and other components such as discussed herein below. A vehicle 180 may be powered in variety of ways, e.g., including with an electric motor and/or internal combustion engine.

The computer 210 includes a processor and a memory. The memory includes one or more forms of computer-readable media, and stores instructions executable by the computer 210 for performing various operations, including as disclosed herein.

The computer 210 may operate the vehicle 180 in an autonomous, semi-autonomous, or non-autonomous mode. For purposes of this disclosure, an autonomous mode is defined as one in which each of vehicle 180 propulsion, braking, and steering are controlled by the computer 210; in a semi-autonomous mode the computer 210 controls one or two of vehicle 180 propulsion, braking, and steering; in a non-autonomous mode, a human operator controls vehicle propulsion, braking, and steering.

The computer 210 may include programming to operate one or more of vehicle brakes, propulsion (e.g., control of acceleration in the vehicle 180 by controlling one or more of an internal combustion engine, electric motor, hybrid engine, etc.), steering, climate control, interior and/or exterior lights, etc., as well as to determine whether and when the computer 210, as opposed to a human operator, is to control such operations.

The computer 210 may include or be communicatively coupled to, e.g., via a vehicle communications bus as described further below, more than one processor, e.g., controllers or the like included in the vehicle for monitoring and/or controlling various vehicle controllers, e.g., a powertrain controller, a brake controller, a steering controller, etc. The computer 210 is generally arranged for communications on a vehicle communication network such as a bus in the vehicle such as a controller area network (CAN) or the like.

Via the vehicle network, the computer 210 may transmit messages to various devices in the vehicle and/or receive messages from the various devices, e.g., the LIDAR sensor 230, actuators 220, etc. Alternatively or additionally, in cases where the computer 210 actually comprises multiple devices, the vehicle communication network may be used for communications between devices represented as the computer 210 in this disclosure. Further, as mentioned below, various controllers and/or sensors 230 may provide data to the computer 210 via the vehicle communication network.

The vehicle 180 actuators 220 may be implemented via circuits, chips, or other electronic components that can actuate various vehicle subsystems in accordance with appropriate control signals as is known. The actuators 220 may be used to control braking, acceleration, and steering of the first vehicle 180. As an example, the vehicle 180 computer 210 may output control instructions to control the actuators 220.

Figure 2:
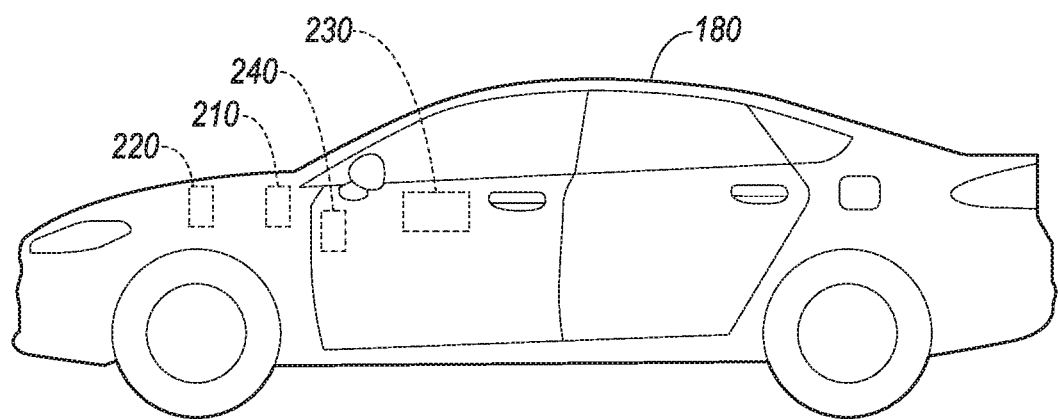
FIG. 2 shows an example vehicle for mapping the area of FIG. 1.

The vehicle 180 may include one or more LIDAR sensor (s) 130, providing data encompassing at least some of an exterior of the vehicle 180. The LIDAR sensor 230 may include a processor that is programmed to transmit LIDAR data via the vehicle 180 network. The LIDAR data may be received by the vehicle 180 computer 210 from LIDAR sensors 230 in a known manner, e.g., via a vehicle 180 network whereby the LIDAR data can be stored in a memory of the computer 210'. The LIDAR data may include coordinates, e.g., in a 3-dimensional cartesian coordinate system. LIDAR data may further include other data pertaining to other objects such as size, relative speed to the host vehicle 180, etc. In one example shown in FIG. 2, a LIDAR sensor 230 may sweep an area 105 in the LIDAR sensor 230 field of view, e.g., an area 105 around the vehicle 180, by transmitting LIDAR beams, e.g., laser beams, and receive reflections of the transmitted LIDAR beams. Typically, a LIDAR sensor 230 can provide data for mapping physical features of sensed objects with a very high resolution.

In addition, the computer 210 may be programmed to communicate through a wireless communication network with, e.g., a remote computer. The wireless communication network, which may include a Vehicle-to-Vehicle (V-to-V) and/or a Vehicle-to-Infrastructure (V-to-I) communication network, includes one or more structures by which the vehicles 180, the remote computer, etc., may communicate with one another, including any desired combination of wireless (e.g., cellular, wireless, satellite, microwave and radio frequency) communication mechanisms and any desired network topology (or topologies when a plurality of communication mechanisms are utilized). Exemplary V-to-V or V-to-I communication networks include cellular, Bluetooth, IEEE 802.11, dedicated short range communications (DSRC), and/or wide area networks (WAN), including the Internet, providing data communication services.

Figure 3:
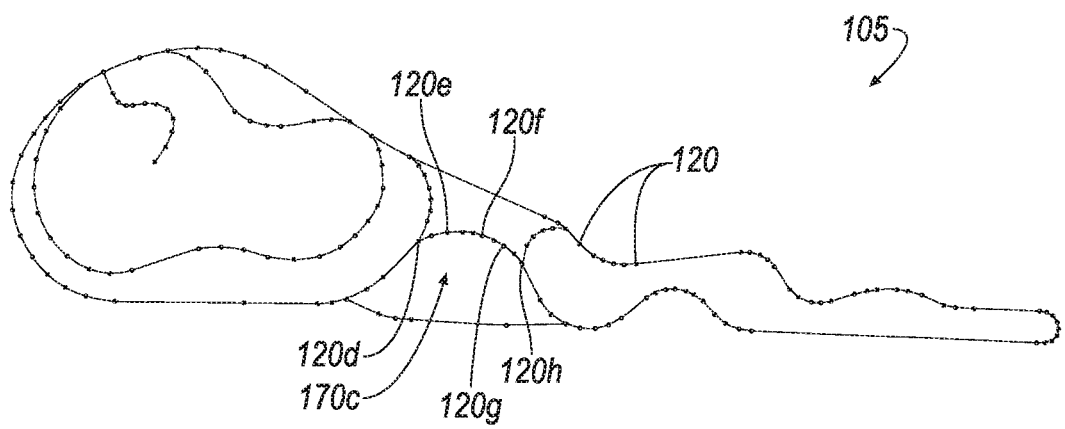
FIG. 3 is shows waypoints determined in an aerial image of the area of FIG. 1.
Figure 4:
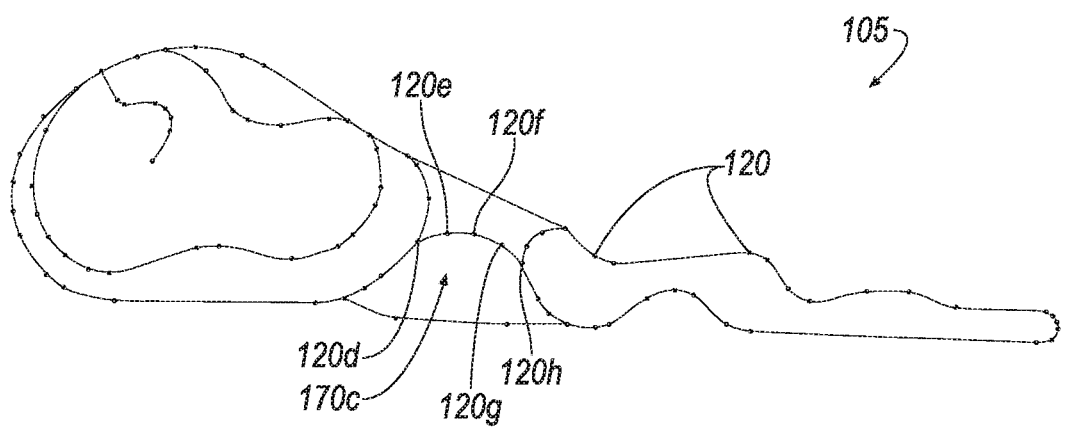
FIG. 4 is shows a reduced number of waypoints determined in the aerial image of FIG. 1.

As discussed above, a mapping vehicle 180 may traverse the roads 130 within an area 105 to collect LIDAR data for generating a 3D map of the respective area 105. With reference to FIGS. 3-4, the computer 210 and/or a remote computer can be programmed to determine a plurality of waypoints 120 for mapping an area 105 by analyzing a received aerial image 110 of the area 105, select an optimal number of the waypoints 120 for mapping, and actuate the vehicle 180 to traverse a route determined to cover the selected waypoints 120.

A route, i.e., a path between a starting location and ending location, can include a set of one or more road 130 segments such as the segment 170*c*. The vehicle 180 computer 210 may be programmed to operate the vehicle 180 to traverse the route. The vehicle 180 computer 210 may be programmed to operate the vehicle 180 components such as propulsion, braking, and/or steering, in an autonomous mode to traverse the route. Additionally or alternatively, the vehicle 180 computer 210 may be programmed to operate the vehicle 180 in a semi-autonomous or non-autonomous mode as discussed with reference to FIG. 6.

As discussed above, waypoints 120 are points on a road 130 surface and/or an intersection 160 surface. As shown in FIG. 3, the computer 210 may be programmed to determine a plurality of waypoints 120 based on the aerial image 110, e.g., using image processing techniques. As discussed above, the roads 130 include road segments 170. The road 130 segments 170 are specified by a first and a second waypoint 120 at a first and a second end of the respective segment 170. Thus, a road 130 may be specified by a plurality of waypoints 120 identified in the aerial image 110. However, not necessarily each single waypoint 120 identified based on the aerial image 110 is necessary to specify a road 130, because a road 130 may be specified by location coordinates of an optimal number of waypoints 120, as discussed below with reference to FIG. 4.

An optimal number of waypoints 120 means a minimum number of waypoints 120 that are sufficient to fit a curve that has an error not exceeding a predetermined error threshold, e.g., 1 meter, from a road 130 lateral middle point. In other words, when a curve is fitted on the optimal number of waypoints 120 on a road 130 segment, then nowhere on the fitted curve a lateral distance from a point on the fitted curve to a respective lateral middle point of road 130 exceeds the predetermined error threshold. As shown in FIG. 4, the computer 210 may be programmed to identify waypoints 120*d*, 120*h* and a plurality of other waypoints between the waypoints 120*d*, 120*h* on a road segment 170*c*. The computer 210 may be programmed to identify an optimal set of waypoints 120*d*, 120*e*, 120*f*, 120*g*, and 120*h*, and to fit a curve on the optimal set of waypoints 120*d*, 120*e*, 120*f*, 120*g*, and 120*h* to determine the road 130 segment 170*c* based on a maximum error threshold, e.g., 1 m. Thus, the selected waypoints 120*d*, 120*e*, 120*f*, 120*g*, and 120*h* may include a first waypoint 120*d* and a second waypoint 120*h* on a road 130 segment 170*c*, and a curve fitted to the first and second waypoints 120*d*, 120*h* corresponds to the road 130 segment 170*c* between the first and second waypoints 120*d*, 120*h*. "Corresponds" means nowhere on the fitted curve a lateral distance from a point on the curve from a center of the road 130 exceeds the predetermined error threshold, e.g., 1 m.

The computer 210 and/or a remote computer may be programmed to generate and/or to update a 3D map, that covers an area 105 included in the received aerial image 110, based at least in part on received LIDAR sensor 230 data. The computer 210 may be programmed to receive vehicle 180 location coordinates from a vehicle 180 GPS sensor 230, and to store the received vehicle LIDAR sensor 230 data and the vehicle 180 location coordinates in a remote computer. The remote computer may be programmed to generate the 3D map of the area 105 by generating a 3D map that includes location coordinates of roads 130 and road 130 features including traffic signs and buildings. In other words, the 3D location coordinates included in the 3D map may include the GPS location coordinates of the points and the height of the points from the ground surface.

The 3D maps are generated based on LIDAR data collected by the mapping vehicle 180 traversing the routes in the area 105. The computer 210 may be programmed, e.g., using known optimization techniques, to determine the route based on the waypoints 120 such that a total driven distance to traverse each road 130 of the area 105 is minimized. In other words, the computer 210 may be programmed to optimize an amount of time and/or fuel used to traverse each waypoint 120 of the area 105.

The computer 210 may be programmed to determine the vehicle 180 route to traverse each of the selected waypoints 120 for at least a predetermined number of times, e.g., 3. Traversing each waypoint 120 multiple times may provide more data from, e.g., buildings, traffic signs, bridges, road 130 boundaries, etc., which may increase a quality of the generated 3D map. Quality herein refers to an accuracy of the 3D location coordinates included in the 3D map.

Figure 5:
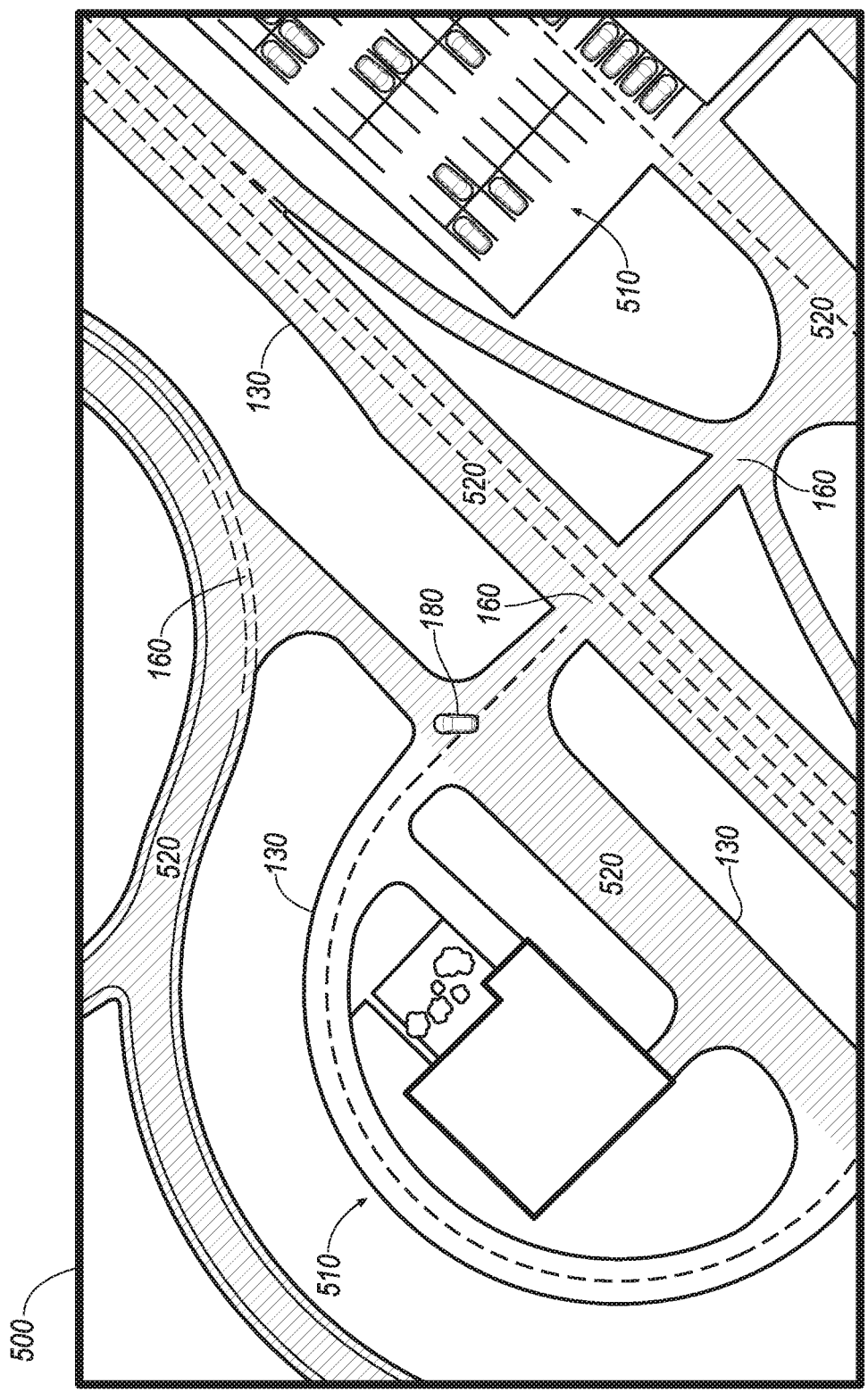
FIG. 5 shows a hybrid image of a portion of the area including generated image data distinguishing waypoint with sufficient data versus waypoints with insufficient data.

In one example shown in FIG. 5, the computer 210 may be programmed to identify waypoints 120 for which sufficient data has been collected, e.g., 3 times traversed, versus the waypoints 120 for which insufficient data has been collected. For example, the computer 210 may be programmed to store a count of traversal for each of the optimal number of waypoints 120 and to generate an aerial hybrid image 500 that illustrates both insufficiently traversed waypoints 510 and sufficiently traversed waypoints 520. The computer 210 may be programmed to identify a waypoint 120 as sufficiently traversed when a count of traversals of the respective waypoint 120 exceeds a predetermined threshold, e.g., 3, and to identify a waypoint 120 as insufficiently traversed when a count of traversals of the respective waypoint 120 is less than the predetermined threshold. The computer 210 may be programmed to output an image 500 to a display device, e.g., the vehicle 180 HMI 240. The image 500 may include the area 105 with data superimposed on the plurality of waypoints 120, and the superimposed data on each of the waypoints 120 is based on a number (or count) of traversals of the respective waypoint 120. For example, the computer 210 may be programmed to generate a hybrid image such as the image 500 including the aerial image 110 of the respective area 105 and generated images (e.g., dashed lines portions of the image) based on the count of traversals stored for each waypoint 120.

The computer 210 may be programmed to generate the route for an area 105 based on stored count of traversals of each waypoint 120 and a predetermined minimum number of expected traversals, e.g., 3. The computer 210 may be programmed to determine a route such that the waypoints 120 with a count of traversals less than the threshold are included in the route. As discussed above, the computer 210 may be programmed to navigate the vehicle 180 by actuating vehicle 180 propulsion, braking, and/or steering to traverse the generated route in an autonomous mode. In another example, the computer 210 may be programmed to generate, e.g., an image 600 including data (such as an arrow) superimposed on a road 130 which guides a vehicle 180 based on the generated route. Thus, the vehicle 180 user may navigate the vehicle 180 based on the generated route to collect data from the waypoints 120 where insufficient data has been collected.

Processing

Figure 7:
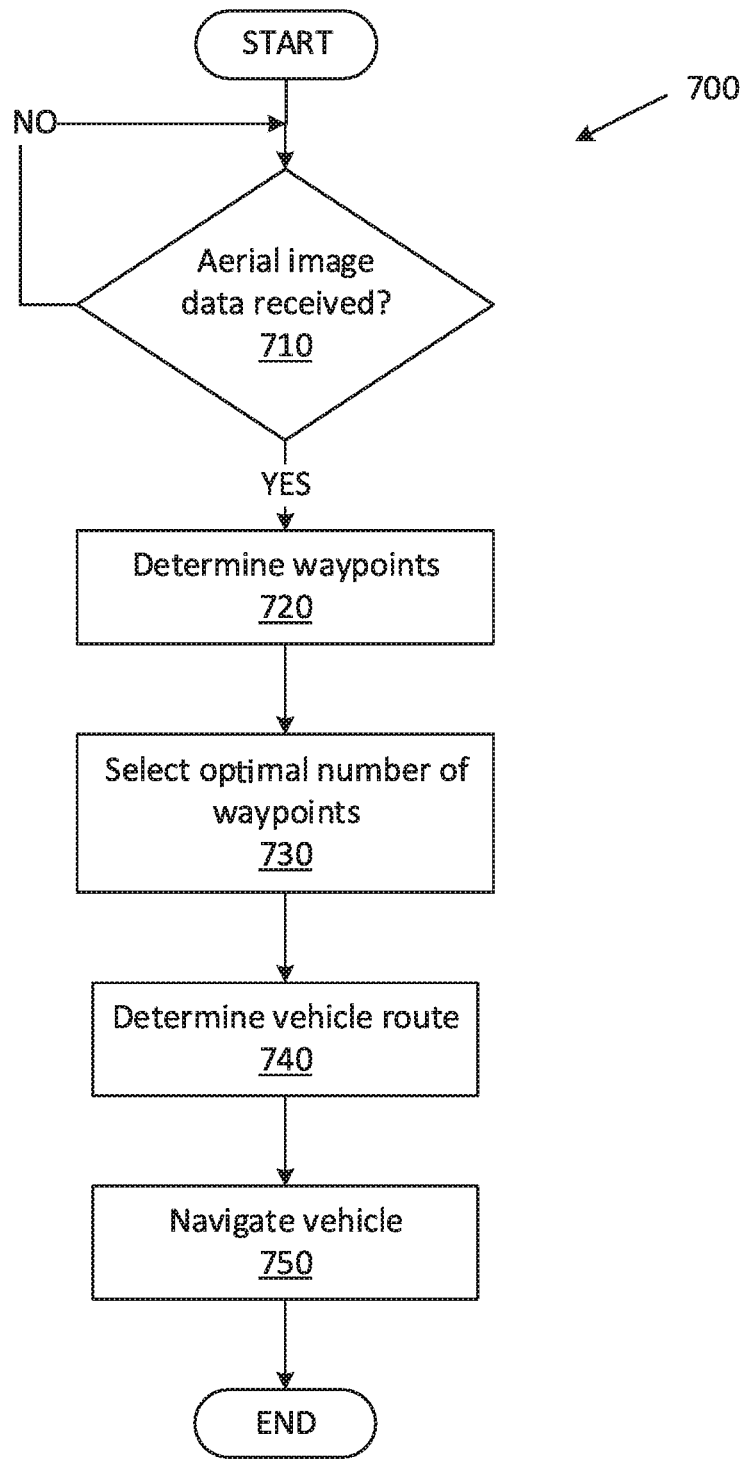
FIG. 7 is a flowchart of an exemplary process for navigating the mapping vehicle.

FIG. 7 is a flowchart of an exemplary process 700 for navigating the mapping vehicle. The vehicle 180 computer 210 may be programmed to execute blocks of the process 700.

The process 700 begins in a decision block 710, in which the computer 210 determines whether aerial image 110 data is received. The computer 210 may be programmed to receive the aerial image 110 data from a satellite 140, a remote computer, etc. If the computer 210 determines that the aerial image 110 data is received, then the process 700 proceeds to a block 720; otherwise the process 700 returns to the decision block 710.

In the block 720, the computer 210 determines waypoints 120 based on the received aerial image 110 data. The computer 210 may be programmed to identify the waypoints 120 in an area 105 included in the aerial image 110 by analyzing the received aerial image 110 data.

Next, in a block 730, the computer 210 selects an optimal number of waypoints 120. The computer 210 may be programmed to identify an optimal number (or set) of waypoints 120d, 120e, 120f, 120g, and 120h, and to fit a curve on the optimal set of waypoints 120d, 120e, 120f, 120g, and 120h to determine the road 130 segment 170c based on a maximum error threshold, e.g., 1 m.

Next, in a block 740, the computer 210 determines a vehicle 180 route to traverse the determined waypoints 120. The computer 210 may be programmed to determine the vehicle 180 route to traverse each of the selected waypoints 120 for at least a predetermined number of times, e.g., 3. The computer 210 may be programmed to determine the vehicle 180 route that includes the entire area 105, i.e., all waypoints 120 within the area 105. Additionally or alternatively, the computer 210 may be programmed to determine a vehicle 180 route including at least the waypoint 120, for which insufficient data has been collected.

Next, in a block 750, the computer 210 navigates the vehicle 180 to traverse the determined route. The vehicle 180 computer 210 may be programmed to navigate the vehicle 180 by actuating components such as propulsion, braking, and/or steering, in an autonomous mode to traverse the route. Additionally or alternatively, the vehicle 180 computer 210 may be programmed to operate the vehicle 180 in a semi-autonomous or non-autonomous mode, e.g., by outputting instructions to the vehicle 180 HMI 240.

Following the block 750, the process 700 ends, or alternatively returns to the decision block 710, although not shown in FIG. 7.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a processor and a memory, the memory storing instructions executable by the processor to:
   determine a plurality of road surface points for mapping an area, based on a road feature including a physical property of the road detected by analyzing a received aerial image of the area;
   select an optimal number of the road surface points for mapping;
   determine a vehicle route to traverse each of the selected road surface points for at least a predetermined number of times;
   actuate a vehicle to traverse the determined vehicle route to cover the selected road surface points; and
   output an image to a display device wherein the image includes the area with data superimposed on the plurality of road surface points, and the superimposed data on each of the road surface points is based on a number of traversals of the respective road surface point.

2. The system of claim 1, wherein the instructions include further instructions to:
   receive vehicle location coordinates from a vehicle sensor; and
   store received vehicle sensor data and the vehicle location coordinates in a remote computer.

3. The system of claim 1, wherein the selected road surface points include a first point and a second point on a road segment, and a curve fitted to the first and second points corresponds to the road segment between the first and second points.

4. The system of claim 1, wherein the instructions include further instructions to at least one of generate and update a map, that covers an area included in the received aerial image, based at least in part on received LIDAR sensor data.

5. The system of claim 4, wherein the map includes location coordinates of one or more roads and road features including traffic signs and buildings.

6. A system, comprising:
   a vehicle;
   means for determining a plurality of road surface points for mapping an area, based on a road feature including a physical property of the road detected by analyzing a received aerial image of the area;
   means for selecting an optimal number of the road surface points for mapping;
   means for actuating a vehicle to traverse a route determined to cover the selected road surface points; and
   means for outputting an image to a display device wherein the image includes the area with data superimposed on the plurality of road surface points, and the superimposed data on each of the road surface points is based on a number of traversals of the respective road surface point.

7. The system of claim 6, further comprising means for determining a vehicle route to traverse each of the selected road surface points for at least a predetermined number of times.

8. A method, comprising:
   determining a plurality of road surface points for mapping an area, based on a road feature including a physical property of the road detected by analyzing a received aerial image of the area;
   selecting an optimal number of the road surface points for mapping; and
   determining a vehicle route to traverse each of the selected road surface points for at least a predetermined number of times;
   actuating a vehicle to traverse the determined vehicle route to cover the selected road surface points; and
   outputting an image to a display device wherein the image includes the area with data superimposed on the plurality of road surface points, and the superimposed data on each of the road surface points is based on a number of traversals of the respective road surface point.

9. The method of claim 8, further comprising at least one of generating and updating a map, that covers an area included in the received aerial image, based at least in part on received LIDAR sensor data.

10. The method of claim 9, wherein the map includes location coordinates of one or more roads and road features including traffic signs and buildings.

11. The method of claim 8, wherein the selected road surface points include a first point and a second point on a road segment, and a curve fitted to the first and second points corresponds to the road segment between the first and second points.

12. The method of claim 8, further comprising:
    receiving vehicle location coordinates from a vehicle sensor; and
    storing received vehicle sensor data and the vehicle location coordinates in a remote computer.

* * * * *